United States Patent
Yoshioka et al.

(10) Patent No.: US 11,430,982 B2
(45) Date of Patent: Aug. 30, 2022

(54) NONPOLAR ALL-SOLID-STATE BATTERY AND ELECTRONIC DEVICE

(71) Applicant: Murata Manufacturing Co., Ltd., Nagaokakyo (JP)

(72) Inventors: Makoto Yoshioka, Nagaokakyo (JP); Kenichi Bando, Nagaokakyo (JP); Akisuke Ito, Nagaokakyo (JP); Ryohei Takano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 273 days.

(21) Appl. No.: 16/844,014

(22) Filed: Apr. 9, 2020

(65) Prior Publication Data

US 2020/0235384 A1    Jul. 23, 2020

Related U.S. Application Data

(63) Continuation of application No. PCT/JP2018/041429, filed on Nov. 8, 2018.

(30) Foreign Application Priority Data

Nov. 13, 2017    (JP) .............................. JP2017-218079

(51) Int. Cl.
  *H01M 4/36*    (2006.01)
  *H01M 4/48*    (2010.01)
  (Continued)

(52) U.S. Cl.
  CPC ........... *H01M 4/364* (2013.01); *H01M 4/483* (2013.01); *H01M 4/485* (2013.01);
  (Continued)

(58) Field of Classification Search
  CPC ...... H01M 4/364; H01M 4/483; H01M 4/485; H01M 4/5825; H01M 10/052;
  (Continued)

(56) References Cited

U.S. PATENT DOCUMENTS 8,551,656 B2    10/2013    Sabi et al.
9,793,573 B2    10/2017    Baba et al.
(Continued)

FOREIGN PATENT DOCUMENTS

EP    1826861 A1    8/2007
JP    2007258165 A    10/2007
(Continued)

OTHER PUBLICATIONS

European Supplementary Search Report issued for EP Application No. 18 87 5640, dated Aug. 19, 2021.
(Continued)

*Primary Examiner* — Christopher P Domone
*Assistant Examiner* — Kimberly Wyluda
(74) *Attorney, Agent, or Firm* — ArentFox Schiff LLP

(57) ABSTRACT

A nonpolar all-solid-state battery that includes a first electrode; a second electrode; and a solid electrolyte layer the first electrode and the second electrode. Each of the first electrode and the second electrode includes a first active material and at least one second active material. The first active material functions as both a positive electrode active material and a negative electrode active material. The first active material has a larger specific capacity when functioning as the positive electrode active material than when functioning as the negative electrode active material. In each of the first electrode and the second electrode, a ratio of the first active material to a total amount of the first and second active materials is more than 50% by mass and less than 100% by mass. A mass of each of the first and second active materials is equal between the first electrode and the second electrode.

16 Claims, 1 Drawing Sheet

(51) Int. Cl.
*H01M 4/485* (2010.01)
*H01M 4/58* (2010.01)
*H01M 10/052* (2010.01)
*H01M 10/0585* (2010.01)
*H01M 10/0562* (2010.01)
*H01M 10/42* (2006.01)

(52) U.S. Cl.
CPC ....... *H01M 4/5825* (2013.01); *H01M 10/052* (2013.01); *H01M 10/0585* (2013.01); *H01M 10/0562* (2013.01); *H01M 2010/4292* (2013.01); *H01M 2220/30* (2013.01)

(58) Field of Classification Search
CPC ......... H01M 10/0585; H01M 10/0562; H01M 2220/30; H01M 2010/4292
See application file for complete search history.

(56) References Cited

U.S. PATENT DOCUMENTS

| | | |
|---|---|---|
| 2007/0202414 A1 | 8/2007 | Yoshida et al. |
| 2011/0117433 A1 | 5/2011 | Sabi et al. |
| 2011/0274974 A1 | 11/2011 | Sabi et al. |
| 2013/0017435 A1 | 1/2013 | Sato et al. |
| 2014/0220393 A1 | 8/2014 | Baba et al. |
| 2015/0333330 A1 | 11/2015 | Sato |
| 2015/0333362 A1 | 11/2015 | Sato |
| 2015/0333366 A1 | 11/2015 | Sato |
| 2017/0125841 A1 | 5/2017 | Ito |

FOREIGN PATENT DOCUMENTS

| | | |
|---|---|---|
| JP | 2009123389 A | 6/2009 |
| JP | 2011108532 A | 6/2011 |
| JP | 2011216235 A | 10/2011 |
| JP | 2013004421 A | 1/2013 |
| JP | 2016001596 A | 1/2016 |
| JP | 2016001598 A | 1/2016 |
| WO | 2010090125 A1 | 8/2010 |

OTHER PUBLICATIONS

International Search Report issued for PCT/JP2018/041429, dated Feb. 12, 2019.
Written Opinion of the International Searching Authority issued for PCT/JP2018/041429, dated Feb. 12, 2019.

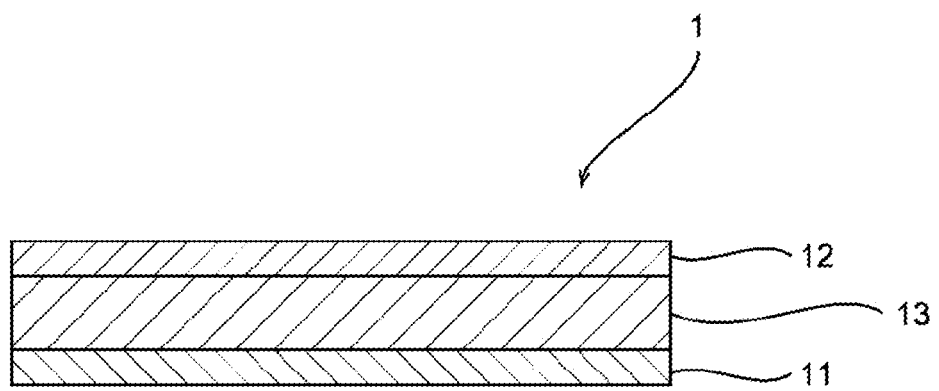

NONPOLAR ALL-SOLID-STATE BATTERY AND ELECTRONIC DEVICE

CROSS REFERENCE TO RELATED APPLICATIONS

The present application is a continuation of International application No. PCT/JP2018/041429, filed Nov. 8, 2018, which claims priority to Japanese Patent Application No. 2017-218079, filed Nov. 13, 2017, the entire contents of each of which are incorporated herein by reference.

FIELD OF THE INVENTION

The present invention relates to an all-solid-state battery and an electronic device including the same.

BACKGROUND OF THE INVENTION

Conventionally, an all-solid-state battery which is nonpolar and has no distinction between a positive electrode and a negative electrode (hereinafter, sometimes referred to as a "nonpolar all-solid-state battery") is known (for example, Patent Document 1 and the like). Specifically, Patent Document 1 describes a nonpolar all-solid-state battery in which both first and second electrode layers include $Li_2MnO_3$ as an active material.

Patent Document 1: Japanese Patent Application Laid-Open No. 2011-216235
Patent Document 2: JP 2007-258165

SUMMARY OF THE INVENTION

When $Li_2MnO_3$ is used as an active material, it is difficult to achieve a high-capacity all-solid-state battery. To achieve a high-capacity all-solid-state battery, an active material having a specific capacity higher than $Li_2MnO_3$ (capacity per active material weight, amount of electricity (Ah/g) according to the number of lithium ions desorbed from the active material) can be used. Examples of the active material having a specific capacity higher than $Li_2MnO_3$ includes, for example, $Li_3V_2(PO_4)_3$.

Patent Document 2 describes an all-solid-state battery in which $Li_3V_2(PO_4)_3$ having a NASICON-type structure is used as a positive electrode active material and a negative electrode active material. However, $Li_3V_2(PO_4)_3$ has a large difference in specific capacity when functioning as the positive electrode active material and when functioning as the negative electrode active material. Therefore, when only $Li_3V_2(PO_4)_3$ is used as the positive electrode active material and the negative electrode active material, it is difficult to achieve a nonpolar all-solid-state battery having no distinction between the positive electrode and the negative electrode.

A main object of the present invention is to provide a high-capacity nonpolar all-solid-state battery.

A nonpolar all-solid-state battery according to the present invention includes a first electrode, a second electrode, and a solid electrolyte layer between the first electrode and the second electrode. Each of the first electrode and the second electrode includes at least one first active material and at least one second active material that is a negative electrode active material. The first active material functions as both a positive electrode active material and a negative electrode active material. The first active material has a larger specific capacity when functioning as the positive electrode active material than a specific capacity when functioning as the negative electrode active material. In each of the first electrode and the second electrode, a ratio of the first active material to a total amount of the first and second active materials is more than 50% by mass and less than 100% by mass. A mass of each of the first and second active materials is equal between the first electrode and the second electrode.

BRIEF EXPLANATION OF THE DRAWINGS

The FIGURE is a schematic cross-sectional view of a nonpolar all-solid-state battery according to one embodiment of the present invention.

DETAILED DESCRIPTION OF THE INVENTION

Hereinafter, an example of a preferred embodiment of the present invention will be described. However, the following embodiment is merely an example. The present invention is not at all limited to the following embodiments.

The FIGURE is a schematic cross-sectional view of a nonpolar all-solid-state battery 1 according to the present embodiment. The nonpolar all-solid-state battery 1 includes a first electrode 11, a second electrode 12, and a solid electrolyte layer 13 between the first electrode 11 and the second electrode 12. Specifically, one main surface of the solid electrolyte layer 13 is in contact with the first electrode 11, and the other main surface is in contact with the second electrode 12. Each of the first electrode 11 and the second electrode 12 is joined to the solid electrolyte layer 13 by sintering. That is, the first electrode 11, the solid electrolyte layer 13, and the second electrode 12 are an integrated sintered body.

The nonpolar all-solid-state battery 1 is a nonpolar all-solid-state battery that functions as a battery when the first electrode 11 is connected to a positive electrode and the second electrode 12 is connected to a negative electrode, and also when the first electrode 11 is connected to the negative electrode and the second electrode 12 is connected to the positive electrode.

Each of the first electrode 11 and the second electrode 12 includes a first active material and at least one kind of negative electrode active material.

The first active material is an active material that functions as both a positive electrode active material and a negative electrode active material. However, the specific capacity when the first active material functions as a positive electrode active material is larger than the specific capacity when the first active material functions as a negative electrode active material. Examples of such a first active material include, for example, $Li_{(3-x)}V_{(2-y)}M_y(PO_4)_3$, where M is at least one kind of element selected from the group consisting of Al, Ge, Ti, Zr, Mg, Fe, Nb, and Sn, $0 \leq x \leq 0.20$, and $0 \leq y \leq 0.20$. Specific examples of $Li_{(3-x)}V_{(2-y)}M_y(PO_4)_3$ include NASICON-type $Li_3V_2(PO_4)_3$, $Li_3Al_{0.1}V_{1.9}(PO_4)_3$, $Li_3Fe_{0.1}V_{1.9}(PO_4)_3$, $Li_{2.95}Ti_{0.05}V_{1.95}(PO_4)_3$, and $Li_3Ti_{0.1}Mg_{0.1}V_{1.8}(PO_4)_3$. Among them, NASICON-type $Li_3V_2(PO_4)_3$ is more preferably used as the first active material.

Each of the first electrode 11 and the second electrode 12 may include one kind of first active material, or may include a plurality of kinds of first active material.

Each of the first electrode 11 and the second electrode 12 includes at least one kind of second active material that is a negative electrode active material in addition to the first active material. In the present invention, the "second active material" refers to an active material that functions as a negative electrode active material but does not substantially function as a positive electrode active material. Here, the phrase "does not substantially function as a positive electrode active material" means that it is an active material that functions only from lithium insertion reaction, that is, no lithium detrimental reaction can occur during charging.

The first electrode 11 and the second electrode 12 may each include, in addition to the first active material and the second active material, for example, a conductive material having electronic conductivity, a solid electrolyte, a structure holding material, a positive electrode active material, and the like. Specific examples of the conductive material preferably used include, for example, metals, carbons, conductive oxides, conductive organic substances. The structure holding material is not particularly limited as long as it does not deteriorate the functions of the active material, the solid electrolyte, and the conductive material by reacting with the solid electrolyte and the conductive material. Specific examples of the structure holding material preferably used include $Al_2O_3$, $SiO_2$, $ZrO_2$, and $GeO_2$. The solid electrolyte included in each of the first electrode 11 and the second electrode 12 preferably has the same crystal structure as that of the solid electrolyte included in the solid electrolyte layer 13, and more preferably is the same solid electrolyte as the solid electrolyte included in the solid electrolyte layer 13. Specific examples of the positive electrode active material preferably used include, for example, $LiVOPO_4$, and $LiVP_2O_7$.

In the nonpolar all-solid-state battery 1 according to the present embodiment, each of the first electrode 11 and the second electrode 12 includes the second active material in addition to the first active material having the larger specific capacity when functioning as a positive electrode active material than the specific capacity when functioning as a negative electrode active material. Therefore, for example, when the first electrode 11 is a positive electrode and the second electrode 12 is a negative electrode, the second active material included in the first electrode 11 does not function as an active material, and the second active material included in the second electrode 12 functions as an active material. When the first electrode 11 is a negative electrode and the second electrode 12 is a positive electrode, the second active material included in the first electrode 11 functions as an active material, and the second active material included in the second electrode 12 does not function as an active material. For this reason, the capacity difference of the nonpolar all-solid-state battery 1 between when the first electrode 11 is a positive electrode and when the first electrode 11 is a negative electrode can be reduced. Thus, for example, an active material such as NASICON-type $Li_3V_2(PO_4)_3$, which has a large specific capacity but has the larger specific capacity when functioning as a positive electrode active material than the specific capacity when functioning as a negative electrode active material can be used in the nonpolar all-solid-state battery 1. Therefore, a high-capacity nonpolar all-solid-state battery 1 can be achieved.

However, when the content of the first active material having a large specific capacity is small, the capacity of the nonpolar all-solid-state battery 1 cannot be sufficiently increased. Therefore, in each of the first electrode 11 and the second electrode 12, the ratio of the first active material to the total amount of the first and second active materials needs to be more than 50% by mass and less than 100% by mass.

From the viewpoint of achieving a nonpolar all-solid-state battery 1 having a larger capacity, in each of the first electrode 11 and the second electrode 12, the ratio of the first active material to the total amount of the first and second active materials is more than 50% by mass, preferably more than 54% by mass, and more preferably 68% by mass or more. In each of the first electrode 11 and the second electrode 12, the ratio of the first active material to the total amount of the first and second active materials is less than 100% by mass, preferably 99% by mass or less, and more preferably 84% by mass or less.

From the same viewpoint, it is preferable to use the first active material having a large specific capacity. Specifically, it is preferable to use, as the first active material, for example, $Li_{(3-x)}V_{(2-y)}M_y(PO_4)_3$, where M is at least one kind of element selected from the group consisting of Al, Ge, Ti, Zr, Mg, Fe, Nb, and Sn, $0 \leq x \leq 0.20$, and $0 \leq y \leq 0.20$, and among them, it is more preferable to use NASICON-type $Li_3V_2(PO_4)_3$.

Further, from the viewpoint of achieving the nonpolar all-solid-state battery 1, the mass of each of the first and second active material needs to be substantially equal between the first electrode 11 and the second electrode 12.

From the viewpoint of achieving a nonpolar all-solid-state battery 1 having a smaller polarity, it is preferable that the total amount of the specific capacity of the first and second active materials included in the first electrode 11 when the first electrode 11 is a positive electrode is substantially equal to the total amount of the specific capacity of the first and second active materials included in the second electrode 12 when the second electrode 12 is a positive electrode. It is preferable that the total amount of the specific capacity of the first and second active materials included in the first electrode 11 when the first electrode 11 is a negative electrode is substantially equal to the total amount of the specific capacity of the first and second active materials included in the second electrode 12 when the second electrode 12 is a negative electrode.

The second active material included in the first electrode 11 and the second electrode 12 is not particularly limited. Examples of the second active material preferably used when the $Li_{(3-x)}V_{(2-y)}M_y(PO_4)_3$ is used as the first active material include, for example, $MO_x$ (where M is at least one selected from the group consisting of Ti, Nb, Mo and P, and $0.9 \leq x \leq 2.5$). Among them, $TiO_2$, $PNb_9O_{25}$, $TiNb_2O_7$, $Ti_2Nb_{10}O_{29}$, and the like are preferably used as the negative electrode active material, and anatase-type $TiO_2$ is more preferably used. This is because the second active material that is a negative electrode active material is difficult to react with the $Li_{(3-x)}V_{(2-y)}M_y(PO_4)_3$.

In the present invention, $MO_x$ includes those in which part of M is substituted with Si, Zr, Y, or the like, and those in which part of oxygen is lost (for example, $TiO_{1.99}$ or the like).

Since the first electrode 11 and the second electrode 12 include the first active material that functions as both a positive electrode active material and a negative electrode active material, the nonpolar all-solid-state battery 1 can be charged and discharged even at a voltage higher than zero volt, and can be charged and discharged at a voltage lower than zero volt.

The solid electrolyte included in the solid electrolyte layer 13 is not particularly limited. From the viewpoint of increasing the close-contact property between the solid electrolyte layer 13 and the first electrode 11 or the second electrode 12, a solid electrolyte having the same crystal structure as the first electrolyte included in the first electrode 11 and the second electrode 12 is preferably used. For example, when the first electrolyte is a NASICON type, it is preferable to use a NASICON-type solid electrolyte. Specific examples of the NASICON-type solid electrolyte include, for example, $Li_{1.5}Al_{0.5}Ge_{1.5}(PO_4)_3$ and $Li_{1.3}Al_{0.3}Ti_{1.7}(PO_4)_3$, $Li_{1.4}Na_{0.1}Al_{0.5}Ge_{1.5}(PO_4)_3$.

As described above, since the nonpolar all-solid-state battery 1 of the present embodiment has a high capacity, a high-performance electronic device can be achieved by using the nonpolar all-solid-state battery 1.

Hereinafter, the present invention will be described in more detail with reference to specific examples. However, the present invention is not limited to the following examples, and can be appropriately changed and carried out without departing from the gist thereof.

Comparative Example 1

In order to produce an all-solid-state battery, respective main materials were prepared as starting materials for the electrode layers 11 and 12 and the solid electrolyte layer 13 as follows. A slurry was produced from each of the prepared main materials, and a green sheet was produced using the slurry.

Preparation of Main Materials

Preparation of Main Materials of Electrode Layers 11 and 12

Powder obtained by mixing powder having a NASICON-type structure crystal phase having a composition of $Li_3V_2(PO_4)_3$ as the active material 1 which is a positive electrode active material, glass powder having a composition of $Li_{1.5}Al_{0.5}Ge_{1.5}(PO_4)_3$ as a solid electrolyte, and carbon powder as a conductive material at a mass ratio of 50:40:10 was used as a main material.

Preparation of Main Material of Solid Electrolyte 13

Glass powder having a composition of $Li_{1.5}Al_{0.5}Ge_{1.5}(PO_4)_3$ was used as a main material.

Production of Each Slurry

Each of the main materials prepared above, polyacetal resin, and alcohol were mixed at a mass ratio of 100:15:140 to produce an electrode slurry and a solid electrolyte slurry.

Production of Each Green Sheet

Each of the slurries produced above was coated on a polyethylene terephthalate (PET) film using a doctor blade method, and dried on a hot plate heated to a temperature of 40° C., and a sheet was formed to have a thickness of 10 μm. The sheet was cut so as to have a plane size of 20 mm×20 mm to produce an electrode layer sheet to be the electrode layer 11, an electrode layer sheet to be the electrode layer 12, and a solid electrolyte layer sheet to be the solid electrolyte layer 13.

Production of All-Solid-State Battery

A laminate was produced, in which the electrode layer sheet to be the electrode layer 11 was laminated on one surface of the solid electrolyte sheet obtained as described above, and the electrode layer sheet to be the electrode layer 12 was laminated on the other surface. This laminate was cut so as to have a plane size of 10 mm×10 mm. Thereafter, each laminate was sandwiched between two porous ceramic plates and fired at a temperature of 500° C. in an air atmosphere to remove the polyacetal resin. Thereafter, by firing the resultant at a temperature of 650° C. in a nitrogen gas atmosphere, an all-solid-state battery element body of Comparative Example 1 was produced.

Thereafter, the resultant was dried at a temperature of 100° C. to remove moisture, and then sealed with a 2032 type coin cell to produce an all-solid-state battery of Comparative Example 1.

Evaluation of All-Solid-State Battery

The all-solid-state battery of Comparative Example 1 was charged to a voltage of 3.2 V at a current of 0.1 mA (held at 3.2 V for 5 hours after reaching 3.2 V), and then discharged to 0 V at a discharge current of 0.1 mA. This charge/discharge was repeated 10 cycles.

The initial charge capacity or discharge capacity per unit weight of the active material and the initial charge capacity or discharge capacity per total active material weight included in the electrode layer 11 or 12 are values shown in Table 2, respectively.

The initial charge/discharge efficiency, which is the ratio between the initial discharge capacity and the initial charge capacity, and the capacity retention ratio after 10 cycles, which is the ratio between the initial discharge capacity and the discharge capacity at the 10th cycle are values shown in Table 2, respectively.

Comparative Example 2

An all-solid-state battery was produced and evaluated in the same manner as in Comparative Example 1 except that, in the electrode layers 11 and 12, powder obtained by mixing powder having a NASICON-type structure crystal phase having a composition of $Li_3V_2(PO_4)_3$ as the active material 1 which is a positive electrode active material, powder having a composition of $Li_4Ti_5O_{12}$ as an active material 2 which is a negative electrode active material, glass powder having a composition of $Li_{1.5}Al_{0.5}Ge_{1.5}(PO_4)_3$ as a solid electrolyte, and carbon powder as a conductive material at a mass ratio of 25:25:40:10 was used as a main material.

Comparative Example 3

An all-solid-state battery was produced and evaluated in the same manner as in Comparative Example 1 except that, in the electrode layers 11 and 12, powder obtained by mixing powder having a NASICON-type structure crystal phase having a composition of $Li_3V_2(PO_4)_3$ as the active material 1 which is a positive electrode active material, powder of anatase-type $TiO_2$ as an active material 2 which is a negative electrode active material, glass powder having a composition of $Li_{1.5}Al_{0.5}Ge_{1.5}(PO_4)_3$ as a solid electrolyte, and carbon powder as a conductive material at a mass ratio of 25:25:40:10 was used as a main material.

Comparative Example 4

An all-solid-state battery was produced and evaluated in the same manner as in Comparative Example 1 except that, in the electrode layers 11 and 12, powder obtained by mixing powder having a composition of $Li_2MnO_3$ as the active material 1 which is a positive electrode active material, glass powder having a composition of $Li_{1.5}Al_{0.5}Ge_{1.5}(PO_4)_3$ as a solid electrolyte, and carbon powder as a conductive material at a mass ratio of 50:40:10 was used as a main material.

Comparative Example 5

An all-solid-state battery was produced and evaluated in the same manner as in Comparative Example 1 except that, in the electrode layers 11 and 12, powder obtained by mixing powder having a composition of $Li_{1.5}Al_{0.5}Ti_{1.5}(PO_4)_3$ as the active material 2 which is a negative electrode active material, $LiFePO_4$ as an active material 3 which is a positive electrode active material that does not function as a negative electrode active material, glass powder having a composition of $Li_{1.5}Al_{0.5}Ge_{1.5}(PO_4)_3$ as a solid electrolyte, and Ag—Pd powder as a conductive material at a mass ratio of 20:20:30:30 was used as a main material.

Example 1

An all-solid-state battery was produced and evaluated in the same manner as in Comparative Example 1 except that, in the electrode layers 11 and 12, powder obtained by mixing powder having a NASICON-type structure crystal phase having a composition of $Li_3V_2(PO_4)_3$ as the active material 1 which is a positive electrode active material, powder of anatase-type $TiO_2$ as the active material 2 which is a negative electrode active material, glass powder having a composition of $Li_{1.5}Al_{0.5}Ge_{1.5}(PO_4)_3$ as a solid electrolyte, and carbon powder as a conductive material at a mass ratio of 40:10:40:10 was used as a main material.

Example 2

An all-solid-state battery was produced and evaluated in the same manner as in Example 1 except that powder of rutile-type $TiO_2$ was used as the active material 2 which is a negative electrode active material.

Example 3

An all-solid-state battery was produced and evaluated in the same manner as in Example 1 except that powder of $Nb_2O_5$ was used as the active material 2 which is a negative electrode active material.

Example 4

An all-solid-state battery was produced and evaluated in the same manner as in Example 1 except that powder of $PNb_9O_{25}$ was used as the active material 2 which is a negative electrode active material.

Example 5

An all-solid-state battery was produced and evaluated in the same manner as in Example 1 except that powder of $TiNb_2O_7$ was used as the active material 2 which is a negative electrode active material.

Example 6

An all-solid-state battery was produced and evaluated in the same manner as in Example 1 except that powder of $Ti_2Nb_{10}O_{29}$ was used as the active material 2 which is a negative electrode active material.

Example 7

An all-solid-state battery was produced and evaluated in the same manner as in Comparative Example 1 except that, in the electrode layers 11 and 12, powder obtained by mixing powder having a NASICON-type structure crystal phase having a composition of $Li_3V_2(PO_4)_3$ as the active material 1 which is a positive electrode active material, powder of anatase-type $TiO_2$ as the active material 2 which is a negative electrode active material, powder of $Ti_2Nb_{10}O_{29}$ as the active material 3 which is a negative electrode active material, glass powder having a composition of $Li_{1.5}Al_{0.5}Ge_{1.5}(PO_4)_3$ as a solid electrolyte, and carbon powder as a conductive material at a mass ratio of 40:5:5:40:10 was used as a main material.

Example 8

An all-solid-state battery was produced and evaluated in the same manner as in Comparative Example 1 except that, in the electrode layers 11 and 12, powder obtained by mixing powder having a NASICON-type structure crystal phase having a composition of $Li_3V_2(PO_4)_3$ as the active material 1 which is a positive electrode active material, powder of anatase-type $TiO_2$ as an active material 2 which is a negative electrode active material, glass powder having a composition of $Li_{1.5}Al_{0.5}Ge_{1.5}(PO_4)_3$ as a solid electrolyte, and carbon powder as a conductive material at a mass ratio of 27.0:23.0:40:10 was used as a main material.

Example 9

An all-solid-state battery was produced and evaluated in the same manner as in Example 8 except that powder obtained by mixing the active material 1, the active material 2, the solid electrolyte, and the conductive material at a mass ratio of 32.5:17.5:40:10 was used as a main material.

Example 10

An all-solid-state battery was produced and evaluated in the same manner as in Example 8 except that powder obtained by mixing the active material 1, the active material 2, the solid electrolyte, and the conductive material at a mass ratio of 34.0:16.0:40:10 was used as a main material.

Example 11

An all-solid-state battery was produced and evaluated in the same manner as in Example 8 except that powder obtained by mixing the active material 1, the active material 2, the solid electrolyte, and the conductive material at a mass ratio of 37.5:12.5:40:10 was used as a main material.

Example 12

An all-solid-state battery was produced and evaluated in the same manner as in Example 8 except that powder obtained by mixing the active material 1, the active material 2, the solid electrolyte, and the conductive material at a mass ratio of 42.0:8.0:40:10 was used as a main material.

Example 13

An all-solid-state battery was produced and evaluated in the same manner as in Example 8 except that powder obtained by mixing the active material 1, the active material 2, the solid electrolyte, and the conductive material at a mass ratio of 43.0:7.0:40:10 was used as a main material.

Example 14

An all-solid-state battery was produced and evaluated in the same manner as in Example 8 except that powder obtained by mixing the active material 1, the active material 2, the solid electrolyte, and the conductive material at a mass ratio of 47.5:2.5:40:10 was used as a main material.

Example 15

An all-solid-state battery was produced and evaluated in the same manner as in Comparative Example 1 except that, in the electrode layers 11 and 12, powder obtained by mixing powder having a NASICON-type structure crystal phase having a composition of $Li_3V_2(PO_4)_3$ as the active material 1 which is a positive electrode active material, powder of $TiNb_2O_7$ as the active material 2 which is a negative electrode active material, powder of $LiVOPO_4$ as the active material 3 which is a positive electrode active material, glass powder having a composition of $Li_{1.2}Na_{0.1}Ti_{1.7}Al_{0.3}(PO_4)_3$ as a solid electrolyte, and carbon powder as a conductive material at a mass ratio of 35:10:5:40:10 was used as a main material, and further, after polyacetal resin was removed, the resultant was fired at a temperature of 900° C. in a nitrogen gas atmosphere.

Example 16

An all-solid-state battery was produced and evaluated in the same manner as in Comparative Example 1 except that, in the electrode layers 11 and 12, powder obtained by mixing powder having a NASICON-type structure crystal phase having a composition of $Li_3V_2(PO_4)_3$ as the active material 1 which is a positive electrode active material, powder of $TiNb_2O_7$ as the active material 2 which is a negative electrode active material, powder of $LiVOPO_4$ as the active material 3 which is a positive electrode active material, powder of rutile-type $TiO_2$ as an active material 4 which is a negative electrode active material, glass powder having a composition of $Li_{1.3}Ti_{1.7}Al_{0.3}(PO_4)_3$ as a solid electrolyte, and carbon powder as a conductive material at a mass ratio of 35.0:7.5:5.0:2.5:40:10 was used as a main material, and further, after polyacetal resin was removed, the resultant was fired at a temperature of 900° C. in a nitrogen gas atmosphere.

Example 17

An all-solid-state battery was produced and evaluated in the same manner as in Comparative Example 1 except that, in the electrode layers 11 and 12, powder obtained by mixing powder having a NASICON-type structure crystal phase having a composition of $Li_3V_2(PO_4)_3$ as the active material 1 which is a positive electrode active material, powder of $TiNb_2O_7$ as a negative electrode active material of the active material 2, powder of $PNb_9O_{25}$ as a negative electrode active material of the active material 3, powder of rutile-type $TiO_2$ as a negative electrode active material of the active material 4, glass powder having a composition of $Li_{1.35}Al_{0.35}Ge_{1.15}Ti_{0.50}(PO_4)_3$ as a solid electrolyte, and carbon powder as a conductive material at a mass ratio of 37.5:9.0:2.5:1.0:40:10 was used as a main material, and further, after polyacetal resin was removed, the resultant was fired at a temperature of 900° C. in a nitrogen gas atmosphere.

Example 18

An all-solid-state battery was produced and evaluated in the same manner as in Comparative Example 1 except that, in the electrode layers 11 and 12, powder obtained by mixing powder having a NASICON-type structure crystal phase having a composition of $Li_3V_2(PO_4)_3$ as the active material 1 which is a positive electrode active material, powder of $PNb_9O_{25}$ as the active material 2 which is a negative electrode active material, glass powder having a composition of $Li_{0.1}Na_{0.1}Ca_{0.1}Zr_{1.9}(PO_4)_3$ as a solid electrolyte, and carbon powder as a conductive material at a mass ratio of 40:10:40:10 was used as a main material, and further, after polyacetal resin was removed, the resultant was fired at a temperature of 900° C. in a nitrogen gas atmosphere.

Example 19

An all-solid-state battery was produced and evaluated in the same manner as in Comparative Example 1 except that, in the electrode layers 11 and 12, powder obtained by mixing powder having a NASICON-type structure crystal phase having a composition of $Li_3Al_{0.1}V_{1.9}(PO_4)_3$ as the active material 1 which is a positive electrode active material, powder of anatase-type $TiO_2$ as the active material 2 which is a negative electrode active material, glass powder having a composition of $Li_{1.5}Al_{0.5}Ge_{1.5}(PO_4)_3$ as a solid electrolyte, and carbon powder as a conductive material at a mass ratio of 40:10:40:10 was used as a main material, and further, after polyacetal resin was removed, the resultant was fired at a temperature of 650° C. in a nitrogen gas atmosphere.

Example 20

An all-solid-state battery was produced and evaluated in the same manner as in Example 19 except that powder having a NASICON-type structure crystal phase having a composition of $Li_{2.95}Ge_{0.05}V_{1.95}(PO_4)_3$ as the active material 1 which is a positive electrode active material was used.

Example 21

An all-solid-state battery was produced and evaluated in the same manner as in Example 19 except that powder having a NASICON-type structure crystal phase having a composition of $Li_{2.95}Ti_{0.05}V_{1.95}(PO_4)_3$ as the active material 1 which is a positive electrode active material was used.

Example 22

An all-solid-state battery was produced and evaluated in the same manner as in Example 19 except that powder having a NASICON-type structure crystal phase having a composition of $Li_{2.95}Zr_{0.05}V_{1.95}(PO_4)_3$ as the active material 1 which is a positive electrode active material was used.

Example 23

An all-solid-state battery was produced and evaluated in the same manner as in Example 19 except that powder having a NASICON-type structure crystal phase having a composition of $Li_3Ti_{0.1}Mg_{0.1}V_{1.8}(PO_4)_3$ as the active material 1 which is a positive electrode active material was used.

Example 24

An all-solid-state battery was produced and evaluated in the same manner as in Example 19 except that powder having a NASICON-type structure crystal phase having a composition of $Li_3Ti_{0.05}Fe_{0.05}V_{1.9}(PO_4)_3$ as the active material 1 which is a positive electrode active material was used.

TABLE 1

| | Composition of Active Material 1 (First Active Material) | Composition of Active Material 2 (All of which are Negative Electrode Active Material) | Active Material 3 | Active Material 4 | Active Material 1% by mass |
|---|---|---|---|---|---|
| Comparative Example 1 | $Li_3V_2(PO_4)_3$ | — | — | — | 100% |
| Comparative Example 2 | $Li_3V_2(PO_4)_3$ | $Li_4Ti_5O_{12}$ | — | — | 50% |
| Comparative Example 3 | $Li_3V_2(PO_4)_3$ | $TiO_2$ (Anatase-type) | — | — | 50% |
| Comparative Example 4 | $Li_2MnO_3$ | — | — | — | 100% |
| Comparative Example 5 | — | $Li_{1.5}Al_{0.5}Ti_{1.5}(PO_4)_3$ | $LiFePO_4$ (Positive Electrode Active Material) | — | 0% |
| Example 1 | $Li_3V_2(PO_4)_3$ | $TiO_2$ (Anatase-type) | — | — | 80% |
| Example 2 | $Li_3V_2(PO_4)_3$ | $TiO_2$ (Rutile-type) | — | — | 80% |
| Example 3 | $Li_3V_2(PO_4)_3$ | $Nb_2O_5$ | — | — | 80% |
| Example 4 | $Li_3V_2(PO_4)_3$ | $PNb_9O_{25}$ | — | — | 80% |
| Example 5 | $Li_3V_2(PO_4)_3$ | $TiNb_2O_7$ | — | — | 80% |
| Example 6 | $Li_3V_2(PO_4)_3$ | $Ti_2Nb_{10}O_{29}$ | — | — | 80% |
| Example 7 | $Li_3V_2(PO_4)_3$ | $TiO_2$ (Anatase-type) | $Ti_2Nb_{10}O_{29}$ (Negative Electrode Active Material) | — | 80% |
| Example 8 | $Li_3V_2(PO_4)_3$ | $TiO_2$ (Anatase-type) | — | — | 54% |
| Example 9 | $Li_3V_2(PO_4)_3$ | $TiO_2$ (Anatase-type) | — | — | 65% |
| Example 10 | $Li_3V_2(PO_4)_3$ | $TiO_2$ (Anatase-type) | — | — | 68% |
| Example 11 | $Li_3V_2(PO_4)_3$ | $TiO_2$ (Anatase-type) | — | — | 75% |
| Example 12 | $Li_3V_2(PO_4)_3$ | $TiO_2$ (Anatase-type) | — | — | 84% |
| Example 13 | $Li_3V_2(PO_4)_3$ | $TiO_2$ (Anatase-type) | — | — | 86% |
| Example 14 | $Li_3V_2(PO_4)_3$ | $TiO_2$ (Anatase-type) | — | — | 95% |
| Example 15 | $Li_3V_2(PO_4)_3$ | $TiNb_2O_7$ | $LiVOPO_4$ (Positive Electrode Active Material) | — | 70% |
| Example 16 | $Li_3V_2(PO_4)_3$ | $TiNb_2O_7$ | $LiVOPO_4$ (Positive Electrode Active Material) | $TiO_2$ (Rutile-type) (Negative Electrode Active Material) | 70% |
| Example 17 | $Li_3V_2(PO_4)_3$ | $TiNb_2O_7$ | $PNb_9O_{25}$ (Negative Electrode Active Material) | $TiO_2$ (Rutile-type) (Negative Electrode Active Material) | 75% |
| Example 18 | $Li_3V_2(PO_4)_3$ | $PNb_9O_{25}$ | — | — | 80% |
| Example 19 | $Li_3Al_{0.1}V_{1.9}(PO_4)_3$ | $TiO_2$ (Anatase-type) | — | — | 80% |
| Example 20 | $Li_{2.95}Ge_{0.05}V_{1.95}(PO_4)_3$ | $TiO_2$ (Anatase-type) | — | — | 80% |
| Example 21 | $Li_{2.95}Ti_{0.05}V_{1.95}(PO_4)_3$ | $TiO_2$ (Anatase-type) | — | — | 80% |
| Example 22 | $Li_{2.95}Zr_{0.05}V_{1.95}(PO_4)_3$ | $TiO_2$ (Anatase-type) | — | — | 80% |
| Example 23 | $Li_3Ti_{0.1}Mg_{0.1}V_{1.8}(PO_4)_3$ | $TiO_2$ (Anatase-type) | — | — | 80% |
| Example 24 | $Li_3Ti_{0.05}Fe_{0.05}V_{1.9}(PO_4)_3$ | $TiO_2$ (Anatase-type) | — | — | 80% |

TABLE 1-continued

|  | Active Material 2% by mass | Active Material 3% by mass | Active Material 4% by mass | Solid Electrolyte Composition | Conductive Material Composition |
|---|---|---|---|---|---|
| Comparative Example 1 | 0% | 0% | 0% | $Li_{1.5}Al_{0.5}Ge_{1.5}(PO_4)_3$ | C |
| Comparative Example 2 | 50% | 0% | 0% | $Li_{1.5}Al_{0.5}Ge_{1.5}(PO_4)_3$ | C |
| Comparative Example 3 | 50% | 0% | 0% | $Li_{1.5}Al_{0.5}Ge_{1.5}(PO_4)_3$ | C |
| Comparative Example 4 | 0% | 0% | 0% | $Li_{1.5}Al_{0.5}Ge_{1.5}(PO_4)_3$ | C |
| Comparative Example 5 | 50% | 50% | 0% | $Li_{1.5}Al_{0.5}Ge_{1.5}(PO_4)_3$ | Ag—Pd |
| Example 1 | 20% | 0% | 0% | $Li_{1.5}Al_{0.5}Ge_{1.5}(PO_4)_3$ | C |
| Example 2 | 20% | 0% | 0% | $Li_{1.5}Al_{0.5}Ge_{1.5}(PO_4)_3$ | C |
| Example 3 | 20% | 0% | 0% | $Li_{1.5}Al_{0.5}Ge_{1.5}(PO_4)_3$ | C |
| Example 4 | 20% | 0% | 0% | $Li_{1.5}Al_{0.5}Ge_{1.5}(PO_4)_3$ | C |
| Example 5 | 20% | 0% | 0% | $Li_{1.5}Al_{0.5}Ge_{1.5}(PO_4)_3$ | C |
| Example 6 | 20% | 0% | 0% | $Li_{1.5}Al_{0.5}Ge_{1.5}(PO_4)_3$ | C |
| Example 7 | 10% | 10% | 0% | $Li_{1.5}Al_{0.5}Ge_{1.5}(PO_4)_3$ | C |
| Example 8 | 46% | 0% | 0% | $Li_{1.5}Al_{0.5}Ge_{1.5}(PO_4)_3$ | C |
| Example 9 | 35% | 0% | 0% | $Li_{1.5}Al_{0.5}Ge_{1.5}(PO_4)_3$ | C |
| Example 10 | 32% | 0% | 0% | $Li_{1.5}Al_{0.5}Ge_{1.5}(PO_4)_3$ | C |
| Example 11 | 25% | 0% | 0% | $Li_{1.5}Al_{0.5}Ge_{1.5}(PO_4)_3$ | C |
| Example 12 | 16% | 0% | 0% | $Li_{1.5}Al_{0.5}Ge_{1.5}(PO_4)_3$ | C |
| Example 13 | 14% | 0% | 0% | $Li_{1.5}Al_{0.5}Ge_{1.5}(PO_4)_3$ | C |
| Example 14 | 5% | 0% | 0% | $Li_{1.5}Al_{0.5}Ge_{1.5}(PO_4)_3$ | C |
| Example 15 | 20% | 10% | 0% | $Li_{1.2}Na_{0.1}Ti_{1.7}Al_{0.3}(PO_4)_3$ | C |
| Example 16 | 15% | 10% | 5% | $Li_{1.3}Al_{0.3}Ti_{1.7}(PO_4)_3$ | C |
| Example 17 | 18% | 5% | 2% | $Li_{1.35}Al_{0.35}Ge_{1.15}Ti_{0.50}(PO_4)_3$ | C |
| Example 18 | 20% | 0% | 0% | $Li_{0.1}Na_{0.1}Ca_{0.1}Zr_{1.9}(PO_4)_3$ | C |
| Example 19 | 20% | 0% | 0% | $Li_{1.5}Al_{0.5}Ge_{1.5}(PO_4)_3$ | C |
| Example 20 | 20% | 0% | 0% | $Li_{1.5}Al_{0.5}Ge_{1.5}(PO_4)_3$ | C |
| Example 21 | 20% | 0% | 0% | $Li_{1.5}Al_{0.5}Ge_{1.5}(PO_4)_3$ | C |
| Example 22 | 20% | 0% | 0% | $Li_{1.5}Al_{0.5}Ge_{1.5}(PO_4)_3$ | C |
| Example 23 | 20% | 0% | 0% | $Li_{1.5}Al_{0.5}Ge_{1.5}(PO_4)_3$ | C |
| Example 24 | 20% | 0% | 0% | $Li_{1.5}Al_{0.5}Ge_{1.5}(PO_4)_3$ | C |

TABLE 2

|  | Initial Charge Capacity mAh/g-Active Material 1 | Initial Discharge Capacity mAh/g-Active Material 1 | Initial Charge Capacity mAh/g-All Active Materials | Initial Discharge Capacity mAh/g-All Active Materials | Initial Capacity Retention Ratio % | Capacity Retention Ratio After 10 Cycles % |
|---|---|---|---|---|---|---|
| Comparative Example 1 | 130 | 70 | 130 | 70 | 54% | 35% |
| Comparative Example 2 | 130 | 80 | 65 | 40 | 62% | 38% |
| Comparative Example 3 | 130 | 75 | 65 | 38 | 58% | 45% |
| Comparative Example 4 | 110 | 55 | 110 | 55 | 50% | 38% |
| Comparative Example 5 | 75 | 50 | 38 | 25 | 67% | 65% |
| Example 1 | 130 | 115 | 104 | 92 | 88% | 86% |
| Example 2 | 130 | 85 | 104 | 68 | 65% | 64% |
| Example 3 | 130 | 90 | 104 | 72 | 69% | 55% |
| Example 4 | 130 | 110 | 104 | 88 | 85% | 80% |
| Example 5 | 130 | 100 | 104 | 80 | 77% | 75% |
| Example 6 | 130 | 110 | 104 | 88 | 85% | 84% |
| Example 7 | 130 | 110 | 104 | 88 | 85% | 81% |
| Example 8 | 130 | 85 | 70 | 46 | 65% | 59% |
| Example 9 | 130 | 90 | 85 | 59 | 69% | 67% |
| Example 10 | 130 | 115 | 88 | 78 | 88% | 88% |
| Example 11 | 130 | 115 | 98 | 86 | 88% | 87% |
| Example 12 | 130 | 114 | 109 | 96 | 88% | 87% |
| Example 13 | 130 | 103 | 112 | 89 | 79% | 75% |
| Example 14 | 130 | 99 | 124 | 94 | 76% | 71% |
| Example 15 | 130 | 105 | 91 | 74 | 81% | 78% |
| Example 16 | 130 | 95 | 91 | 67 | 73% | 70% |
| Example 17 | 130 | 110 | 98 | 83 | 85% | 79% |
| Example 18 | 130 | 102 | 104 | 82 | 78% | 75% |
| Example 19 | 116 | 102 | 93 | 82 | 88% | 88% |

TABLE 2-continued

|  | Initial Charge Capacity mAh/g-Active Material 1 | Initial Discharge Capacity mAh/g-Active Material 1 | Initial Charge Capacity mAh/g-All Active Materials | Initial Discharge Capacity mAh/g-All Active Materials | Initial Capacity Retention Ratio % | Capacity Retention Ratio After 10 Cycles % |
|---|---|---|---|---|---|---|
| Example 20 | 115 | 98 | 92 | 78 | 85% | 84% |
| Example 21 | 113 | 99 | 90 | 79 | 88% | 86% |
| Example 22 | 112 | 95 | 90 | 76 | 85% | 84% |
| Example 23 | 111 | 96 | 89 | 77 | 86% | 85% |
| Example 24 | 109 | 95 | 87 | 76 | 87% | 85% |

From the results of Comparative Example 1, Comparative Example 3, Example 1, and Examples 8 to 14, it is found that a large initial discharge capacity and a high capacity retention ratio can be achieved when the first active material that functions as both the positive electrode active material and the negative electrode active material and has the larger specific capacity when functioning as the positive electrode active material than the specific capacity when functioning as the negative electrode active material, and at least one kind of second active material that is a negative electrode active material are used, and when the ratio of the first active material to the total amount of the first and second active materials is more than 50% by mass and less than 100% by mass in each of the first electrode and the second electrode.

Further, from the results of Example 1 and Examples 8 to 14, it is found that, from the viewpoint of achieving a larger initial discharge capacity, a higher charge/discharge efficiency, and a high capacity retention ratio, in each of the first electrode and the second electrode, the ratio of the first active material to the total amount of the first and second active materials is more than 54% by mass, preferably 99% by mass or less, more preferably 68% by mass or more, and more preferably 84% by mass or less.

From the results of Examples 1 to 7, it is found that a large initial discharge capacity, a high charge/discharge efficiency, and a high capacity retention rate can be realized even when various second active materials represented by the general formula $MO_x$ (where M is at least one kind of element selected from the group consisting of Ti, Nb, Mo, and P, and $0.9 \leq x \leq 2.5$) are used.

From the results of Example 7, Example 16, and Example 17, it is found that a large initial discharge capacity, a high charge/discharge efficiency, and a high capacity retention rate can be achieved even when two or more kinds of second active materials are used.

The nonpolar all-solid-state battery according to the present embodiment includes the first electrode, the second electrode, and the solid electrolyte layer. The solid electrolyte layer is provided between the first electrode and the second electrode. Each of the first electrode and the second electrode includes a first active material and at least one kind of second active material. The first active material functions as both a positive electrode active material and a negative electrode active material. The first active material is an active material having a larger specific capacity when functioning as the positive electrode active material than a specific capacity when functioning as the negative electrode active material. In each of the first electrode and the second electrode, a ratio of the first active material to a total amount of active materials is more than 50% by mass and less than 100% by mass. A mass of each of the active materials is equal between the first electrode and the second electrode.

In the nonpolar all-solid-state battery according to the present embodiment, it is preferable that the total amount of the specific capacities of all the active materials included in the first electrode (capacity per total active material weight included in the first electrode) when the first electrode is a positive material is equal to the total amount of the specific capacities of all the active materials included in the second electrode (capacity per total active material weight included in the second electrode) when the second electrode is a positive electrode. It is preferable that the total amount of the specific capacities of all the active materials included in the first electrode when the first electrode is a negative electrode is substantially equal to the total amount of the specific capacities of all the active materials included in the second electrode when the second electrode is a negative electrode.

In the nonpolar all-solid-state battery according to the present embodiment, it is preferable that the first active material is a NASICON-type active material $Li_{(3-x)}V_{(2-y)}M_y(PO_4)_3$ (where M is at least one kind of element selected from the group consisting of Al, Ge, Ti, Zr, Mg, Fe, Nb, and Sn, $0 \leq x \leq 0.20$, and $0 \leq y \leq 0.20$).

In the nonpolar all-solid-state battery according to the present embodiment, it is preferable that the second active material is $MO_x$ (where M is at least one kind of element selected from the group consisting of Ti, Nb, Mo, and P, and $0.9 \leq x \leq 2.5$).

In the nonpolar all-solid-state battery according to the present embodiment, it is preferable that the second active material is at least one kind of active material selected from the group consisting of $TiO_2$, $PNb_9O_{25}$, $TiNb_2O_7$, and $Ti_2Nb_{10}O_{29}$.

In the nonpolar all-solid-state battery according to the present embodiment, it is preferable that the second active material is anatase-type $TiO_2$.

In the nonpolar all-solid-state battery according to the present embodiment, it is preferable that the ratio of the first active material to the total amount of the first and second active materials is more than 54% by mass and 99% by mass or less.

In the nonpolar all-solid-state battery according to the present embodiment, it is preferable that the ratio of the first active material to the total amount of the first and second active materials is 68% by mass or more and 84% by mass or less.

In the nonpolar all-solid-state battery according to the present embodiment, it is preferable that the solid electrolyte layer includes a NASICON-type solid electrolyte.

The invention claimed is:
1. A nonpolar all-solid-state battery comprising:
a first electrode;
a second electrode; and
a solid electrolyte layer between the first electrode and the second electrode, wherein each of the first electrode and the second electrode includes:
at least one first active material that functions as both a positive electrode active material and a negative electrode active material, and has a larger specific capacity when functioning as the positive electrode active material than a specific capacity when functioning as the negative electrode active material; and
at least one second active material that is a negative electrode active material, and
in each of the first electrode and the second electrode, a ratio of the at least one first active material to a total amount of the at least one first and second active materials is more than or equal to 54% by mass and less than or equal to 95% by mass, and a mass of each of the at least one first and second active materials is equal between the first electrode and the second electrode.

2. The nonpolar all-solid-state battery according to claim 1, wherein
a total amount of specific capacities of the at least one first and second active materials included in the first electrode when the first electrode is the positive electrode is equal to a total amount of specific capacities of the at least one first and second active materials included in the second electrode when the second electrode is the positive electrode, and
wherein the total amount of the specific capacities of the at least one first and second active materials included in the first electrode when the first electrode is the negative electrode is substantially equal to the total amount of the specific capacities of the at least one first and second active materials included in the second electrode when the second electrode is the negative electrode.

3. The nonpolar all-solid-state battery according to claim 1, wherein the at least one first active material is a $Li_{(3-x)}V_{(2-y)}M_y(PO_4)_3$ material, where M is at least one kind of element selected from Al, Ge, Ti, Zr, Mg, Fe, Nb, and Sn, $0 \leq x \leq 0.20$, and $0 \leq y \leq 0.20$.

4. The nonpolar all-solid-state battery according to claim 1, wherein the at least one first active material is selected from a NASICON-type $Li_3V_2(PO_4)_3$, $Li_3Al_{0.1}V_{1.9}(PO_4)_3$, $Li_3Fe_{0.1}V_{1.9}(PO_4)_3$, $Li_{2.95}Ti_{0.05}V_{1.95}(PO_4)_3$, and $Li_3Ti_{0.1}Mg_{0.1}V_{1.8}(PO_4)_3$, or combinations thereof.

5. The nonpolar all-solid-state battery according to claim 3, wherein the at least one second active material is $MO_x$, where M is at least one element selected from Ti, Nb, Mo, and P, and $0.9 \leq x \leq 2.5$.

6. The nonpolar all-solid-state battery according to claim 5, wherein the at least one second active material is at least one selected from $TiO_2$, $PNb_9O_{25}$, $TiNb_2O_7$, and $Ti_2Nb_{10}O_{29}$.

7. The nonpolar all-solid-state battery according to claim 5, wherein the at least one second active material is anatase-type $TiO_2$.

8. The nonpolar all-solid-state battery according to claim 5, wherein part of M in the $MO_x$ is substituted with Si, Zr, or Y, and/or part of oxygen is lost.

9. The nonpolar all-solid-state battery according to claim 1, wherein the at least one second active material is $MO_x$, where M is at least one element selected from Ti, Nb, Mo, and P, and $0.9 \leq x \leq 2.5$.

10. The nonpolar all-solid-state battery according to claim 9, wherein the at least one second active material is at least one selected from $TiO_2$, $PNb_9O_{25}$, $TiNb_2O_7$, and $Ti_2Nb_{10}O_{29}$.

11. The nonpolar all-solid-state battery according to claim 9, wherein the at least one second active material is anatase-type $TiO_2$.

12. The nonpolar all-solid-state battery according to claim 9, wherein part of M in the $MO_x$ is substituted with Si, Zr, or Y, and/or part of oxygen is lost.

13. The nonpolar all-solid-state battery according to claim 1, wherein the ratio of the at least one first active material to the total amount of the at least one first and second active materials is 68% by mass or more and 84% by mass or less.

14. The nonpolar all-solid-state battery according to claim 1, wherein the solid electrolyte layer includes a NASICON-type solid electrolyte.

15. The nonpolar all-solid-state battery according to claim 14, wherein the first and second electrodes include the NASICON-type solid electrolyte.

16. An electronic device comprising the nonpolar all-solid-state battery according to claim 1.

* * * * *